United States Patent
Hartmann et al.

(10) Patent No.: US 8,380,986 B2
(45) Date of Patent: *Feb. 19, 2013

(54) METHOD FOR ANALYZING SIMULTANEOUSLY TRANSMITTED, ENCODED DATA STREAMS

(75) Inventors: Siegfried Hartmann, Kranzberg (DE); Jörg Krumböck, Bietigheim-Bissingen (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 115 days.

This patent is subject to a terminal disclaimer.

(21) Appl. No.: 12/675,610

(22) PCT Filed: Jul. 23, 2008

(86) PCT No.: PCT/EP2008/059631
§ 371 (c)(1),
(2), (4) Date: Nov. 15, 2010

(87) PCT Pub. No.: WO2009/027157
PCT Pub. Date: Mar. 5, 2009

(65) Prior Publication Data
US 2011/0060907 A1    Mar. 10, 2011

(30) Foreign Application Priority Data
Aug. 30, 2007 (DE) .......................... 10 2007 041 145

(51) Int. Cl.
*H04L 9/00* (2006.01)
(52) U.S. Cl. ............................ 713/160; 713/168; 380/42
(58) Field of Classification Search .................. 713/168; 380/42
See application file for complete search history.

(56) References Cited

U.S. PATENT DOCUMENTS 7,917,946 B2 * 3/2011 Lindholm et al. .............. 726/14
2003/0200176 A1   10/2003 Foster et al.
(Continued)

FOREIGN PATENT DOCUMENTS
EP        1195968 A2    4/2002
WO    2005/091549 A1    9/2005

OTHER PUBLICATIONS

International Preliminary Report on Patentability for PCT/EP2008/059631 dated Oct. 28, 2008 (Forms PCT/IB/338, PCT/IB/373, PCT/IB/237) (English Translation).
Chen et al., "Security Consideration of IPTV Intermediate Devices", International Telecommunication Union Focus Group on IPTV, FG IPTV-C-0491, May 2007, pp. 1-5.

(Continued)

*Primary Examiner* — Matthew Smithers
(74) *Attorney, Agent, or Firm* — Buchanan Ingersoll & Rooney PC

(57) ABSTRACT

In a data stream individually encoded data stream (ds1 . . . n), data packets formed as key data packets (sp1 . . . n) are to be inserted, with which the data stream-individual key information (si1 . . . n) is transmitted with the associated data stream (ds1 . . . n). For analyzing and/or recording, at least one key data packet (sp1 . . . n) is searched for in the associated data stream (ds1 . . . n), and the data stream-individual key information (si1 . . . n) is determined. By means of the data stream-individual key information (si1 . . . n), the associated data stream (ds1 . . . n) is decoded. The generation and insertion of key information (si1 . . . n) can be achieved with minor administrative effort, thus considerably reducing the effort for the analysis or diagnosis (ds1 . . . n) of the simultaneously transmitted, encoded data streams (ds1 . . . n). Advantageously, the insertion of key data packets can only be activated or initiated if the diagnosis or analysis and/or recording of the data streams is currently carried out.

19 Claims, 1 Drawing Sheet

U.S. PATENT DOCUMENTS

| | | |
|---|---|---|
| 2005/0108746 A1* | 5/2005 | Futagami et al. ............... 725/31 |
| 2005/0135419 A1 | 6/2005 | Pullen et al. |
| 2005/0163316 A1* | 7/2005 | Wing ............................ 380/257 |
| 2005/0254656 A1* | 11/2005 | Rose et al. .................... 380/277 |
| 2006/0062393 A1* | 3/2006 | Hsu et al. ...................... 380/281 |
| 2007/0064951 A1 | 3/2007 | Unger |
| 2008/0066152 A1* | 3/2008 | Wong et al. ....................... 726/2 |
| 2008/0144824 A1* | 6/2008 | Stewart et al. ................ 380/257 |

OTHER PUBLICATIONS

Baugher et al., "The Secure Real-Time Transport Protocol (SRTP)", The Internet Society (2004), pp. 1-56.

English translation of the International Search Report (Form PCT/ISA/210) for PCT/EP2008/059631.

Written Opinion of the International Searching Authority (Form PCT/ISA/237) for PCT/EP2008/059631.

* cited by examiner

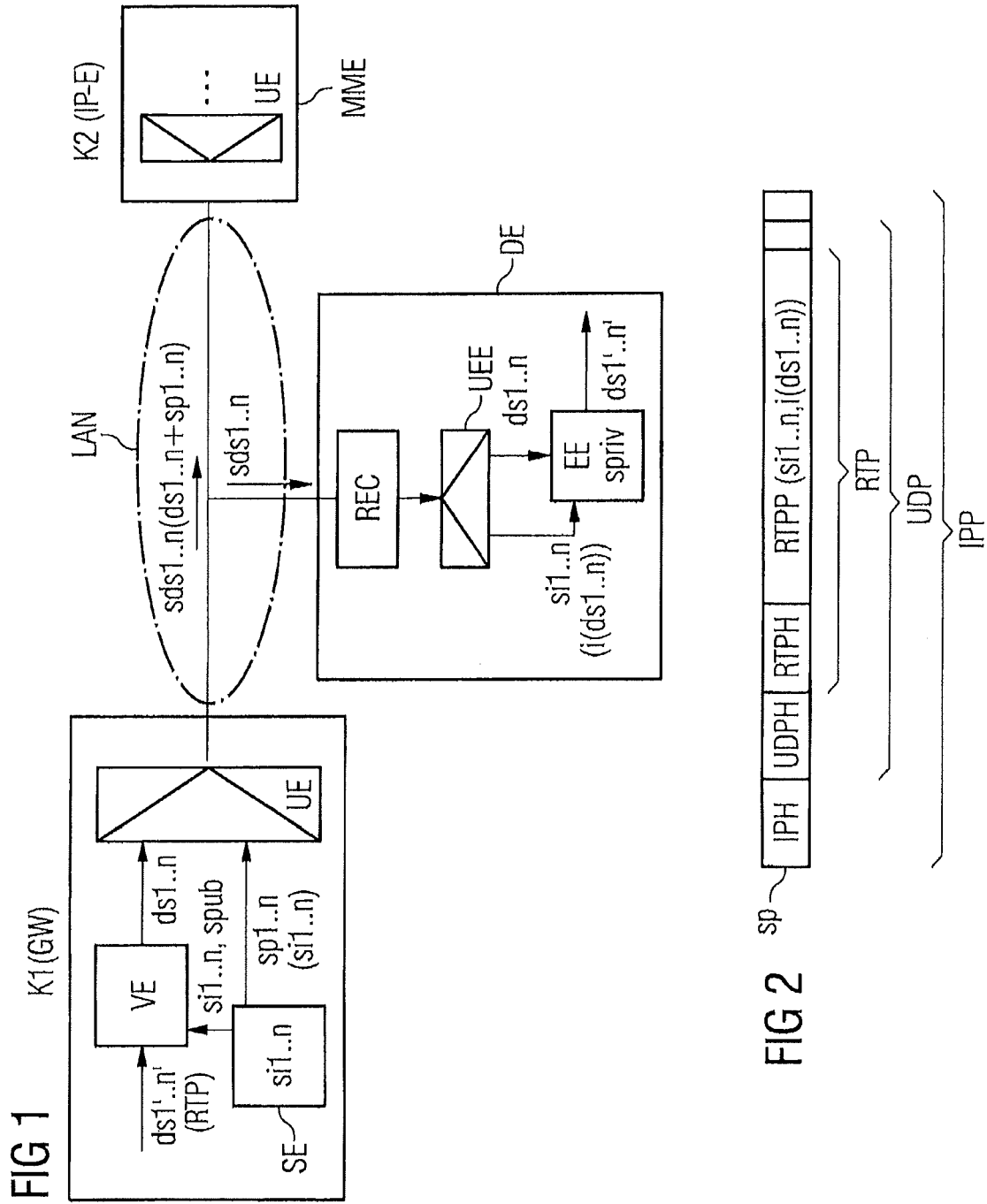

METHOD FOR ANALYZING SIMULTANEOUSLY TRANSMITTED, ENCODED DATA STREAMS

CROSS-REFERENCE TO RELATED APPLICATIONS

This application is the United States national phase under 35 U.S.C. §371 of International Application No. PCT/EP2008/059631, filed on Jul. 23, 2008, and claiming priority to German Application No. 10 2007 041 145.8, filed on Aug. 30, 2007. Those applications are incorporated by reference herein.

BACKGROUND OF THE INVENTION

1. Field of the Invention

Embodiments of the invention are related to analysis of individual or simultaneously transmitted data streams containing data packets.

2. Background of the Art

In communication networks, especially in Voice Over IP communication networks, the RTP (Real Time Protocol) is often used to transmit data streams or multimedia data streams consisting of data packets, i.e., user information or speech information. The RTP is defined in RFC standard 1889, or since 2003 in RFC standard 3550. Due to increased security requirements, data streams have been transmitted encrypted for quite some time, and the secure RTP used for this is described in RFC standard 3711. In this context, the key information required for encryption is assigned and used on a data-stream-specific basis. As an example, for a multimedia session between two endpoints on an IP-based communication network, an audio and a video data stream are each transmitted in one transmission direction. Related to both transmission directions, four data streams are transmitted within a multimedia session, each of which is encrypted separately, i.e., encrypted data-stream-specifically. The key information for that particular session or data stream is assigned or processed during connection signaling—using the SIP (Session Initiation Protocol), for example—with a special key used to encrypt the connection signaling—Pre-shared Secrets, for example—which cannot be recognized even if the data stream is hacked.

In communication networks, multiple data streams or multimedia data streams are generally transmitted through a transmission leg or transmission segment. For problem situations arising in communication networks, analysis or diagnosis of the transmitted data streams is necessary in order to locate or delimit errors. For error analysis or diagnosis, reconstruction of the unencrypted data streams is usually necessary. An analysis or diagnosis is often performed on transmission segments with multiple data streams transmitted simultaneously using the RTP, so that the key information in the data streams (RTP data streams, for example), is not available and cannot be determined even during connection signaling, because the signaling information and the key information are re-encrypted, and the key information used is not available.

BRIEF SUMMARY OF THE INVENTION

It would be useful to improve the analysis or diagnosis of individual or simultaneously transmitted data streams containing data packets, with data streams generated and encrypted data-stream-specifically according to a network protocol for data stream transmission.

One aspect of embodiments taught herein lies in the fact that data packets generated as key data packets are inserted into each generated data stream, and they transmit the data-stream-specific key information for that data stream. For an analysis, at least one key data packet is searched for in the data stream, and the data-stream-specific key information is determined; using that data-stream-specific key information, the associated data stream is decrypted.

An important advantage of the invention is that key information can be generated and inserted with minimal administrative effort, and the effort required to analyze or diagnose simultaneously transmitted data streams is significantly reduced. Another advantage is that the insertion of key data packets can be activated or initiated only if diagnosis or analysis of the data streams is currently in progress.

According to one embodiment of the invention, a data packet type for key data packets is determined in the network protocol, so that when the data stream is received according to the network protocol, the key data packets are discarded. This ensures that key information cannot be read when data packets are transmitted to a network protocol-compliant data receiver according to the network protocol. As an alternative, a data packet type that is new to the network protocol can be defined for the key data packets, or an unused data packet type can be provided, which is not read when data packets are transmitted to a network protocol-compliant receiver according to the network protocol.

According to another preferred embodiment of the invention, the key data packet is represented by a data packet in whose header or expanded header the key information is inserted, and the generated header information is of a type such that the key information is discarded when the data stream is received according to the network protocol.

Additional preferred developments of the invented method and one embodiment of an analysis unit according to the invention can be found in other claims.

The following text further explains the invention and some of its embodiments with reference to two drawings.

BRIEF DESCRIPTION OF THE FIGURES

FIG. 1, a schematic showing one communication arrangement for applying the invented method, and FIG. 2, a key data packet suitable for the communication arrangement according to the invention.

DETAILED DESCRIPTION OF THE INVENTION

FIG. 1 is a schematic diagram showing an example of a communication arrangement in which the invented method is used, including only components in which the invented method is implemented or which clarify the embodiment shown.

The communication arrangement is suitable for Voice Over IP, i.e., for transmitting spoken information in the IP protocol, with signaling by means of the standardized H.323 or SIP protocol. For speech and/or video transmission, use of the RTP (Real Time Protocol) is preferred, with speech and/or video information transmitted directly between the components that are connected by signaling. The RTP protocol is defined in RFC standard 1889 or 3550 and consists of a protocol for continuous transmission of real-time data, e.g., audiovisual or multimedia data over IP-based networks. Under this protocol, data packets to be transmitted are coded and inserted for transmission over IP-based networks in data packets, with each session having at least one data stream ds or multiple data streams assigned to it. The RTP protocol is suitable for transmission of individual data streams ds as well as for simultaneous transmission of multiple data streams ds1 . . . n or data packets. For the execution example given here, it is assumed that multiple data streams ds1 . . . n, i.e. multimedia streams, are transmitted simultaneously between components of an IP-based network.

Due to increased security requirements for transmitting data streams ds, it has become increasingly common to encrypt data streams ds, especially data streams ds transmitted according to the RTP protocol. Key information si, which is recognized by the components between which the data streams are transmitted in an IP-based network, is used for this encryption. A protocol for encrypting RTP data streams is defined in the SRTP protocol (Secure Real Time Protocol) according to RFC standard 3711. It uses a symmetrical encryption system that offers a high degree of security.

The communication arrangement consists of a first component K1 that is represented in the execution example by a Gateway GW. The Gateway GW can, for example, be connected via a local network LAN—hereafter designated as LAN and represented in FIG. 1 by a dash-and-dot outlined oval—to a second component K2, which in the execution example is represented by an Internet endpoint IP-E such as a multimedia terminal MME. The LAN can consist physically and procedurally of an Ethernet, for example.

For the execution example, it is further assumed that multiple data streams ds1' . . . n' or multimedia data streams generated according to the RTP are to be transmitted simultaneously from the Gateway GW to the Internet endpoint IP-E. As an example, the multiple data streams ds1' . . . n' are generated as audio data streams and video data streams, and both an audio and a video data stream can be assigned to each session. In addition, the data streams ds1' . . . n' generated according to the RTP protocol are encrypted data-stream-specifically, using an encryption unit VE. This means that, for each data stream ds1' . . . n', a different piece of key information si1 . . . n is designated for encryption. RTP data streams ds are encrypted preferably using the SRTP protocol according to RFC standard 3711.

According to the invention, the encrypted data streams ds1 . . . n from the data-stream-specifically encrypted data streams ds1 . . . n should be decrypted for analysis of the data streams by a diagnosis unit DE. Normally a diagnosis unit DE is not involved in the signaling between the connection-generating components of an IP-based network, so as part of the signaling the used key information si is processed for each individual data stream. Of course, signaling could also be analyzed by the diagnosis unit DE, but the key information si1 . . . n for the data streams ds1 . . . n could not be determined, because the signaling and the key information si1 . . . n are encrypted again and the pieces of key information for these encryptions are not available to the diagnosis unit, nor can they be determined from the signaling information. This means that the diagnosis unit DE has no information about the key information si used in the data streams ds1 . . . n.

So that data streams ds1 . . . n generated according to the SRTP protocol can still be decrypted, the invented method is used, with the invented method applied in the execution example to the simultaneous transmission of multiple data streams ds1 . . . n generated according to the SRTP protocol from the Gateway GW to the IP endpoint IP-E. The methods and components described below apply to the opposite transmission direction.

In the Gateway GW, the data streams ds1' . . . n' are encrypted in an encryption unit VE according to the SRTP protocol. The required key information si1 . . . n is stored in a key unit SE and is available from the key unit SE, which is designated in FIG. 1 by an arrow marked with si1 . . . n. This means that a piece of key information si1 . . . n is designated for each data stream ds1' . . . n', i.e., the data streams ds1' . . . n' are encrypted data-stream-specifically.

Also in the key unit SE, key data packets sp1 . . . n are generated for each data stream ds1 . . . n, and the key information si1 . . . n needed to decrypt the data-stream-specifically encrypted data streams ds1 . . . n is inserted in the key data packets sp1 . . . n. The key data packets sp1 . . . n and the encrypted data streams ds1 . . . n are sent to a transmission unit UE. In the transmission unit UE, the key data packets sp1 . . . n are inserted data-stream-specifically into the data streams ds1 . . . n, i.e., the first key data packets sp1 are inserted into the first data stream ds1, the second key data packets sp2 into the second data stream ds2, etc. Preferentially, key data packets sp1 . . . n are inserted continuously into each of the encrypted data streams ds1 . . . n. The key data packets sp1 . . . n are normally inserted into the data streams ds1 . . . n by a data packet multiplexer, represented in FIG. 1 by a multiplexer triangle.

For increased security when transmitting key data packets sp1 . . . n, the key data packets (sp1 . . . n) can also be encrypted. Additional key information is needed for this, and it is generated using a public key spublic and a private key spriv. In this case, the public key spub for the additional encryption is provided in the key unit SE in the Gateway GW and is sent to the transmission unit UE for encrypting the key data packets sp1 . . . n, shown in FIG. 1 as an arrow marked spub. The private key spriv is provided to the diagnosis unit DE by the decryption unit EE and is used to decrypt the additional encrypted key data packets (sdp1 . . . n), shown in FIG. 1 by the designation spriv in the decryption unit EE.

The data streams sds1 . . . n containing key data packets sp1 . . . n are transmitted over the LAN to the IP endpoint IP-E. A diagnosis unit DE connected to the LAN is provided for the purpose of diagnosing or analyzing the data streams sds1 . . . n. So that the data streams sds1 . . . n containing the key data packets sp1 . . . n can be analyzed, the encrypted data streams sds1 . . . n must be decrypted. As explained previously, for each encrypted data stream ds1 . . . n, the key information si1 . . . n needed for decryption is necessary. Because the key data packets sp1 . . . n containing the key information si1 . . . n are inserted into the data streams sds1 . . . n according to the invention, the key data packets sp1 . . . n in each data stream ds1 . . . n are searched for, read, and stored in the diagnosis unit DE with the help of a monitoring unit UEE. Preferentially, the entire key data packet sp1 . . . n would not be sent and stored, but rather only the key information si1 . . . n contained in it. Together with each piece of key information si1 . . . n, a piece of information i(ds1 . . . n) from the key data packets sp1 . . . n must also be determined and stored, for which the data stream sds1 . . . n that contains the key data packets sp1 . . . n is provided with the key information si1 . . . n for decryption. For the following execution example it is assumed that, with the help of a demultiplexer function provided in the monitoring unit UEE—shown in FIG. 1 as a triangle—the key data packets sp1 . . . n that were found are eliminated from the data streams sds1 . . . n containing the key data packets sp1 . . . n after determination and storage of the key information si1 . . . n, and only the encrypted data streams sds1 . . . n are sent to a decryption unit EE.

The key information si1 . . . n, including the information i(ds1 . . . n) is also sent to the decryption unit ESE. In this unit, using the key information si1 . . . n, i.e., with the decryption information and the information i(ds1 . . . n), the encrypted data streams sds1 . . . n are decrypted. After decryption, the unencrypted data streams ds1' . . . n' are ready for diagnosis or analysis in the diagnosis unit DE.

Preferentially, the diagnosis unit DE is provided with a recording unit REC inserted between the LAN and the diagnosis unit DE, for example, in which the data streams sds1 . . . n containing the key data packets sp1 . . . n can be recorded. The recorded data streams sds1 . . . n can then be analyzed or diagnosed at a later time; they can be recorded at night, for example, and diagnosed later during the day. Alternatively, the recording unit REC can also be inserted after the encrypted data streams sds1 . . . n are decrypted—not shown—so that the data streams ds1' . . . n' are unencrypted when readied for diagnosis or analysis.

FIG. 2 shows the protocol structure of a key data packet sp, in which a piece of key information si is inserted. The key data packet sp is generated according to the standard RTP and includes an RTPH header portion according to RFC 3550—known as a header in the industry—and an RTPP user data portion known as the payload. The RTP protocol is embedded in a UDP protocol, whose header UDPH is added into the RTP protocol header RTPH. Because an IP-based transmission is involved, the UDP protocol is packed into an IP protocol IPP, to which an IP header IPH is added. When there is a transmission over the LAN, especially an Ethernet LAN, the corresponding protocol element is still referenced—shown only partially for clarity.

In the header RTP of the RTP protocol, the information about the payload type PT shows information that is important to the invented method. According to the invention, the payload type PT used is designated in the RTP protocol, but no payload type PT is assigned to it. A payload type PT of "19" is defined in the standardization phase, but it is later designated as unused and then as "reserved." Therefore, to designate an RTP data packet as a key data packet sp1 . . . n, the use of payload type 19 is preferred.

The payload type PT is positioned in the standardized RTP header RTPH as shown in Table 1, with the numbering 0.9 represents a byte.

TABLE 1

```
 0                   1                   2                   3
 0 1 2 3 4 5 6 7 8 9 0 1 2 3 4 5 6 7 8 9 0 1 2 3 4 5 6 7 8 9 0 1
+---+-+-+-------+-+-+-----------+-------------------------------+
|V=2|P|X|  CC   |M|     PT      |       sequence number         |
+---+-+-+-------+-+-+-----------+-------------------------------+
```

The key information si1 . . . n for each data stream ds1 . . . n is inserted in the user data portion RTPP of a key data packet sp. Table 2 shows the key information si used for decryption according to the standardized SRTP, with the numbering 0.9 representing a byte.

As part of this process, the information from Table 1 is assigned according to the standard and the following definitions.

Version:
  Version of the tracebeacon.
BeaconType:
In
  Content of the tracebeacon.
F:
  Indicate if the lengths of the variable fields is fixed to their maximum values (the lengths are fixed if F=1).
Rsv:
  Reserved bits.
NbCtx:
  Indicates the number of contexts contained in the packet. A context is an association between a direction (Tx/Rx) and an SSRC. It has been judged that a maximum of 15 contexts should suffice for the current purposes.
NbKeys:
  Indicates the number of keys contained in the packet.
SCIAuthTagLen:
  The length of the authentication tag appended to the tracebeacon. This length will always be zero for now as the authentication is not expected to be used in the short-term.
KEK SPI Len:
  Length in bytes of the SPI needed to retrieve the key that encrypted the KEK. This length can be zero if the Encrypted KEK is not present in the tracebeacon.
Encrypted KEK length:
  Length of the symmetric key encrypted using RSA, in bytes. This length can be zero if the tracebeacon does not contain this key. Since the Encrypted KEK can be the longest part of the tracebeacon, sending the Encrypted KEK in, say, one tracebeacon out of two can result in appreciable gains in the average size of the tracebeacons sent.

TABLE 2

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Version    |  BeaxonType   |F  Rsv | NbCtx |    NbKeys     |
+-+-+-+-+-+-+-+-+-+-+-+-+-+-+-+-+-+-+-+-+-+-+-+-+-+-+-+-+-+-+-+-+
| SCIAuthTagLen |  KEK SPI len  |     Encrypted KEK length      |
+-+-+-+-+-+-+-+-+-+-+-+-+-+-+-+-+-+-+-+-+-+-+-+-+-+-+-+-+-+-+-+-+
~                           Contexts                            ~
+-+-+-+-+-+-+-+-+-+-+-+-+-+-+-+-+-+-+-+-+-+-+-+-+-+-+-+-+-+-+-+-+
~                             Keys                              ~
+-+-+-+-+-+-+-+-+-+-+-+-+-+-+-+-+-+-+-+-+-+-+-+-+-+-+-+-+-+-+-+-+
~                         Encrypted KEK                         ~
+-+-+-+-+-+-+-+-+-+-+-+-+-+-+-+-+-+-+-+-+-+-+-+-+-+-+-+-+-+-+-+-+
~                            KEK SPI                            ~
+-+-+-+-+-+-+-+-+-+-+-+-+-+-+-+-+-+-+-+-+-+-+-+-+-+-+-+-+-+-+-+-+
~                     SCI Authentication tag                    ~
+-+-+-+-+-+-+-+-+-+-+-+-+-+-+-+-+-+-+-+-+-+-+-+-+-+-+-+-+-+-+-+-+
```

Contexts:
　Configuration information for the contexts (see the next diagrams).
Keys:
　Configuration information for the keys (see the next diagrams).
Encrypted KEK:
　Symmetric key encrypted using RSA. This field can take up to 256 bytes when the public key has 2048 bits and does not need to end on a 32 bits boundary. This field is also optional as it can have a length of zero
KEK SPI:
　Identifier that allows to retrieve the key needed to decrypt the KEK. In your case this field corresponds to a Certificate Id. This field does not need to end on a 32 bits boundary. Like the Encrypted KEK this field is optional, as it can have a length of zero.
SCI Authentication tag:
　The authentication tag of the tracebeacon. The authenticated portion of the tracebeacon will be the first eight bytes, the contexts and keys sections. This field is optional, as the authentication tag length can be zero. It is indeed not expected to be present for this version of the tracebeacon.

Using the previously described key information si1 . . . n according to the standardized SRTP protocol, the encrypted data streams ds1 . . . n are decrypted, i.e. transformed back into the original data streams ds1' . . . n'. The data streams ds1' . . . n' can be processed in the diagnosis unit DE using the implemented diagnosis routines—not shown.

The invention claimed is:

1. A method for decrypting at least one encrypted data stream comprising a first data stream containing data packets wherein the first data stream is a data stream that is specifically generated and specifically encrypted according to a network protocol for encrypting and transmitting data streams, the method comprising:
　generating key data packets for the first data stream, each of the key data packets having a header in which at least one piece of key information is included so that there is at least one piece of key information within each of the key data packets, the at least one piece of key information containing information needed to decrypt at least a portion of the first data stream;
　inserting said key data packets in the first data stream;
　transmitting the data packets and the key data packets of the first data stream;
　searching for at least one of the key data packets in the first data stream by searching for data packets having a predefined payload type that is assigned to the key data packets;
　determining key information from the at least one key data packet found via the searching; and
　decrypting at least a portion of the first data stream using the determined key information.

2. The method of claim 1, further comprising discarding the key data packets after the key information is determined according to the network protocol.

3. The method of claim 2, wherein the data packet payload type defines a data packet type, the data packet type selected from the group consisting of a data packet type that is new to the network protocol and an unused data packet type.

4. The method of claim 1, wherein key information is within a user data portion of each of the key data packets.

5. The method of claim 1, wherein the inserting of the key data packets occurs continuously.

6. The method of claim 1, comprising encrypting at least one of the key data packets so that additional key information is included within the encrypted at least one key data packet.

7. The method of claim 6, comprising representing the additional key information as an asymmetrical piece of key information, so that a piece of key information is provided for encrypting key data packets that is different from that used to decrypt the data stream.

8. The method of claim 1, wherein the network protocol is Secured Real Time Protocol.

9. The method of claim 1, comprising activating and subsequently deactivating the insertion of key data packets for analysis and/or recording of the data streams.

10. The method of claim 1, wherein the header being of a type such that the at least one piece of key information is discarded when the data stream is received in accordance with the network protocol.

11. The method of claim 1 wherein the header is an expanded header.

12. The method of claim 1 further comprising discarding the at least one key data packets found via the searching after determining the key information.

13. The method of claim 1 wherein the key data packets are of a type such that a network protocol compliant data receiver cannot read the key information of the key data packets, the network protocol compliant data receiver being a multimedia terminal.

14. The method of claim 1 wherein the key data packets are of a type such that a network protocol compliant data receiver does not read the key information of the key data packets in accordance with the network protocol, the network protocol compliant data receiver being a multimedia terminal.

15. The method of claim 1 wherein the key data packets are inserted into the first data stream via a data packet multiplexer.

16. An arrangement for decrypting at least one encrypted data stream comprising a first data stream that contains data packets, wherein the first data stream is data-stream-specifically generated and data-stream-specifically encrypted according to a network protocol for encrypting and transmitting data streams, the arrangement comprising:
　a gateway connected to a network, the gateway generating key data packets for the first data stream, each of the key data packets having a header in which at least one piece of key information is included so that there is at least one piece of key information within each of the key data packets, the at least one piece of key information containing information needed to decrypt at least a portion of the first data stream, the gateway inserting said key data packets in the first data stream and transmitting the data packets and the key data packets of the first data stream, the first data stream being transmitted from the gateway to a multimedia terminal;
　a diagnosis unit connected to a network to which the gateway is connected, the diagnosis unit searching for at least one of the key data packets in the first data stream by searching for data packets having a predefined payload type that is assigned to the key data packets, the diagnosis unit determining the key information from the at least one key data packet found via the searching and decrypting the first data stream using the determined key information so that at least a portion of the first data stream is at least one of diagnosable and analyzable.

17. The arrangement of claim 16, wherein the wherein the inserting of the key data packets occurs continuously.

18. The arrangement of claim 16, wherein the diagnosis unit comprises a recording unit, the recording unit recording the first data stream.

19. The arrangement of claim 16, wherein the gateway inserts the key data packets into the first data stream such that the insertion is adjustable so that at least one of analysis and recording of the first data stream is activateable and deactivateable.

* * * * *